United States Patent [19]

Lane, Jr.

[11] 4,035,462
[45] July 12, 1977

[54] MOLDED THERMOPLASTIC ARTICLE AND METHOD OF MAKING SAME

[76] Inventor: Noel W. Lane, Jr., 2106 Windmill View Road, El Cajon, Calif. 92020

[21] Appl. No.: 321,758

[22] Filed: Jan. 8, 1973

[51] Int. Cl.$^2$ .................... B29C 25/00; B29C 5/04
[52] U.S. Cl. ............................. 264/89; 264/230; 264/310
[58] Field of Search .......... 264/310, 311, 230, 302, 264/89, 96

[56] References Cited
U.S. PATENT DOCUMENTS

| | | | |
|---|---|---|---|
| 2,838,798 | 6/1958 | Rekettye | 264/311 |
| 2,874,964 | 2/1959 | Edwards | 264/311 |
| 2,886,853 | 5/1959 | Herman et al. | 264/230 |
| 3,117,346 | 1/1964 | Bertin et al. | 264/310 |
| 3,151,196 | 9/1964 | Tipton | 264/302 |
| 3,316,339 | 4/1967 | Breneman | 264/310 |
| 3,350,745 | 11/1967 | Schott et al. | 264/311 |
| 3,439,079 | 4/1969 | McDowell | 264/310 |
| 3,652,760 | 3/1972 | Petri | 264/310 |

*Primary Examiner*—Robert F. White
*Attorney, Agent, or Firm*—Herbert E. Kidder

[57] ABSTRACT

A method of making a completely closed, thin-walled, hollow article of fusible, or thermoplastic resin (such as polyethylene) without seams or a vent hole, comprising the steps of: rotationally molding the article in a mold heated to a temperature above the fusion point of the resin; and rapidly chilling the molded part from a temperature above the heat distortion point of the resin to a temperature well below the heat distortion point; causing the plastic to stiffen and become rigid before it is collapsed by the partial vacuum inside the part due to contraction of the trapped air as it cools. In one embodiment of the invention, the mold itself is rapidly chilled by cold air or water sprays, causing the molded part to chill rapidly before the air can cool. In another embodiment, the part is removed from the mold and allowed to cool and partially collapse; after which the part is reheated slowly up to a temperature slightly above the heat distortion point. Air trapped inside the part expands, and elastic memory of the resin causes the heat-softened part to resume its original molded shape. The part is then chilled rapidly, to stiffen the resin in the undistorted shape before the air inside has a chance to cool and contract.

1 Claim, 7 Drawing Figures

---

ROTATIONAL MOLDING OF TOTALLY CLOSED, HOLLOW ENVELOPE, WITHOUT SEAMS OR VENT HOLES, USING FUSIBLE MOLDING RESIN POWDER IN A MOLD THAT IS HEATED ABOVE THE FUSION TEMPERATURE OF THE RESIN.

RAPID CHILLING OF THE MOLDED PART FROM A TEMPERATURE ABOVE THE HEAT DISTORTION POINT OF THE RESIN TO A TEMPERATURE WELL BELOW THE HEAT DISTORTION POINT, CAUSING THE PLASTIC TO STIFFEN AND BECOME RELATIVELY RIGID BEFORE IT CAN BE COLLAPSED BY THE PARTIAL VACUUM INSIDE THE PART DUE TO CONTRACTION OF ENCLOSED AIR AS IT COOLS.

FIG. 1.

```
ROTATIONAL MOLDING OF TOTALLY CLOSED, HOLLOW
ENVELOPE, WITHOUT SEAMS OR VENT HOLES, USING
FUSIBLE MOLDING RESIN POWDER IN A MOLD THAT
IS HEATED ABOVE THE FUSION TEMPERATURE OF THE RESIN.
```

```
RAPID CHILLING OF THE MOLDED PART FROM A
TEMPERATURE ABOVE THE HEAT DISTORTION POINT
OF THE RESIN TO A TEMPERATURE WELL BELOW THE
HEAT DISTORTION POINT, CAUSING THE PLASTIC TO
STIFFEN AND BECOME RELATIVELY RIGID BEFORE IT
CAN BE COLLAPSED BY THE PARTIAL VACUUM INSIDE THE
PART DUE TO CONTRACTION OF ENCLOSED AIR AS IT COOLS.
```

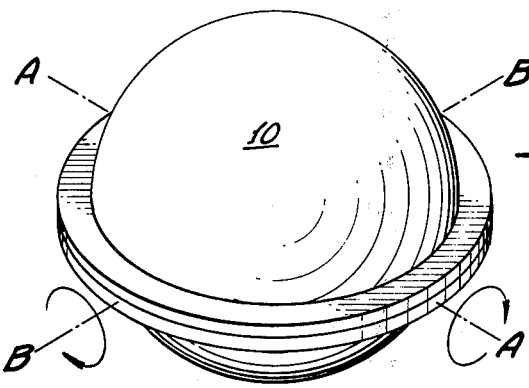

FIG. 2.

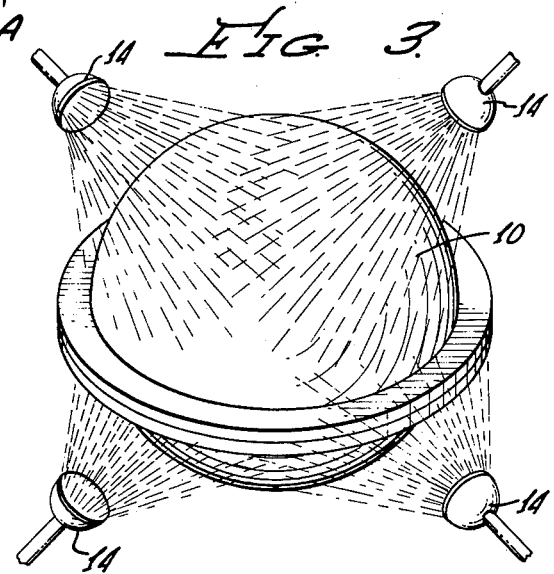

FIG. 3.

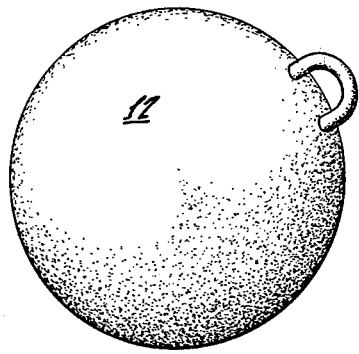

```
ROTATIONAL MOLDING OF TOTALLY CLOSED, HOLLOW ENVELOPE,
WITHOUT SEAMS OR VENT HOLES, USING FUSIBLE MOLDING
RESIN POWDER IN A MOLD THAT IS HEATED ABOVE THE
FUSION TEMPERATURE OF THE RESIN.
```

↓

```
COOL DOWN THE MOLD AND MOLDED PART, AND REMOVE
THE PART FROM THE MOLD, ALLOWING IT TO COLLAPSE
PARTIALLY AS THE AIR TRAPPED INSIDE COOLS AND CONTRACTS.
```

↓

```
REHEAT MOLDED PART TO TEMPERATURE SLIGHTLY ABOVE HEAT
DISTORTION POINT, CAUSING AIR INSIDE TO EXPAND, AND PLASTIC
MEMORY OF HEAT-SOFTENED RESIN TO RESTORE PART TO
ORIGINAL MOLDED FORM.
```

↓

```
RAPIDLY CHILL MOLDED PART TO TEMPERATURE WELL BELOW
HEAT DISTORTION POINT, SO THAT RESIN IS STIFFENED AND
MADE RIGID BEFORE AIR INSIDE HAS A CHANCE TO COOL
AND CONTRACT.
```

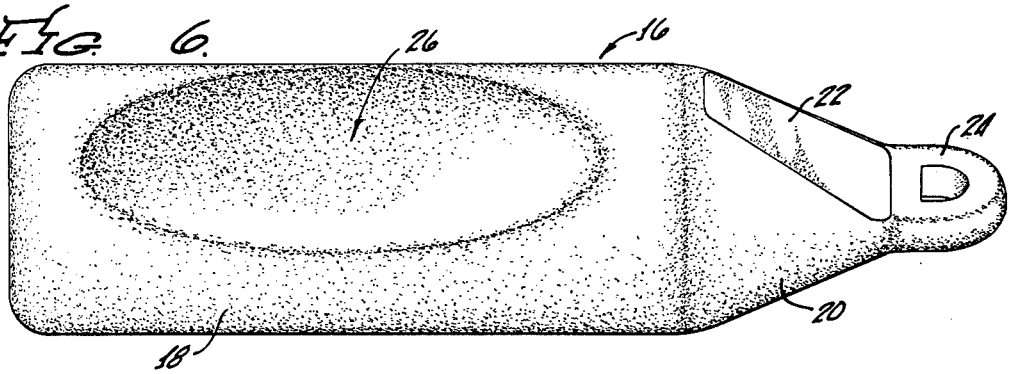

FIG. 6.

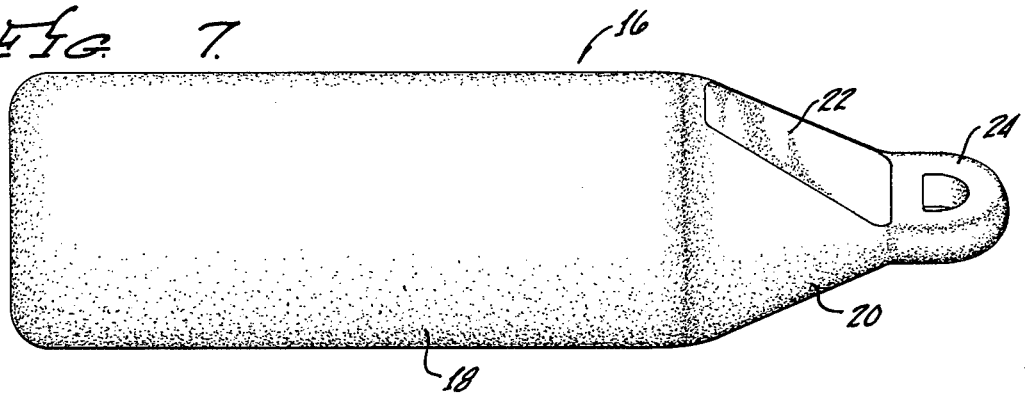

FIG. 7.

MOLDED THERMOPLASTIC ARTICLE AND METHOD OF MAKING SAME

BACKGROUND OF THE INVENTION

The present invention pertains to a method of molding completely closed, thin-walled, seamless hollow articles of fusible, or thermoplastic resin, such as polyethylene for example, without providing a vent hole in the article to vent the air enclosed within the article. More specifically, the invention pertains to a method of molding hollow fishing buoys, and also the fishing buoys or other articles produced by the method.

Plastic fishing buoys used in arctic seas are exposed to extremely severe conditions, owing to the cold temperatures, severe tidal surges that cause the buoys to be submerged to considerable depths, attacks by sea lions and other marine creatures, impact against rocks and the sides of fishing boats, and rough handling, all of which contribute to wear and tear on the buoys. The first molded plastic buoys were made of two molded plastic halves that were welded together, but the weld seam proved to be a line of weakness that quickly failed under the severe stresses of arctic usage. One-piece, seamless buoys made by the rotational molding process were tried next, but the plug that was used to seal the vent hole which has always been, until now, necessary when molding hollow parts by the rotational molding system, has proved to be a serious weakness that fails under stress, with consequent loss of the buoys and the traps to which they were attached. Vent holes in rotationally molded, completely closed, hollow parts have heretofore been considered absolutely essential to the molding process, to allow air to move into or out of the hollow part as the air heats up and expands, or cools and contracts. If no vent hole is provided, the hollow part will partially collapse as it cools after being molded, owing to the partial vacuum produced by contraction of the air trapped inside. This can be overcome by considerably increasing the wall thickness of the part, based on the physical properties of the plastic material at the heat distortion temperature, but this results in an overdesigned part which takes more material, is more costly to manufacture and is heavier to use. For this reason, conventional rotational molding processes require a venting hole in the part to prevent formation of a partial vacuum inside the buoy. This vent hole is then sealed, which introduces the possibility of a leak at the seal.

SUMMARY OF THE INVENTION

The primary object of the present invention is to provide a new and improved method of making a relatively thin-walled, hollow article, such as a fishing buoy, of fusible or thermoplastic resin, such as polyethylene, which has no vent hole, and therefore no weakness at the seal, or other possibility of leaking.

Another object of the invention is to provide a seamless, thin-walled fishing buoy or similar hollow article having an uninterrupted surface that is completely free of any sealed vent holes, which might leak or give trouble.

These and other objects and advantages of the invention will become apparent to those skilled in the art from the following detailed description of the preferred embodiments thereof, taken in conjunction with the drawings.

BRIEF DESCRIPTION OF THE DRAWINGS

FIG. 1 is a flow diagram, showing the sequence of steps by which the method of the present invention is carried out;

FIG. 2 is a schematic drawing, showing a rotational mold for producing spherical fishing buoys, and the manner in which it is rotated about two axis during the molding operation;

FIG. 3 is another schematic drawing, showing the mold of FIG. 2 being rapidly chilled by water sprays;

FIG. 4 is a perspective view of a spherical, hollow buoy made in the mold shown in FIGS. 2 and 3;

FIG. 5 is another flow diagram of a modified form of the invention, showing the sequence of steps by which the method is carried out;

FIG. 6 is a perspective side view of a trailer buoy molded of thermoplastic resin, showing the partially collapsed condition of the part after if has been removed from the mold and cooled; and FIG. 7 is a similar view of the same, showing the buoy after being heated up to a temperature just above the heat distortion point of the plastic, at which point the elastic memory of the plastic causes it to resume its original molded shape, followed by rapid chilling of the buoy to maintain this stiffened condition before the air inside has a chance to cool and contract.

DESCRIPTION OF THE PREFERRED EMBODIMENT

FIG. 2 of the drawings shows a schematic representation of a rotational mold 10 having a hollow cavity on the inside, of the same configuration as the spherical fishing buoy 12, which is shown in FIG. 4. The mold 10 is conventional, and made of two mating halves that are joined together during the molding operation. Upon completion of the molding operation, the two halves are opened to remove the molded part.

A measured quantity of thermoplastic, or fusible resin powder or pellets, preferably a cross-linkable polyolefin, of which cross-linkable polyethylene is the preferred resin, is placed inside the cavity of the mold. Cross-linkable polyethylene is conventional polyethylene with which a catalyst has been compounded that causes cross-linking of the resin to take place. The mole is then closed, and rotated simultaneously about the two axes A—A and B—B, while being heated up to the fusion, or melting temperature of the plastic resin. As the mold temperature reaches about 260° F, the powdered or pelleted resin begins to melt and spreads uniformly over the entire inside surface of the mold cavity, forming a continuous, uninterrupted shell of melted plastic. Cross-linking starts almost immediately as the resin melts, and continues throughout the molding cycle, being virtually completed by the time the mold temperature reaches 475° F. As cross-linking progresses, the heat-distortion temperature of the polyethylene increases, until, upon completion of the molding cycle, it is about 350° F. After about 15 minutes at 475° F, the polyethylene is completely cross-linked, and is no longer a thermoplastic material. However, it does have a heat-distortion point of about 350° F, which means that at 350° F the polyethylene will soften enough so that it will distort. In the conventional rotational molding process, the mold is allowed to cool down to a temperature below the fusion point of the resin, at which point the mold is opened and the molded part removed therefrom.

The present invention differs from conventional rotational molding techniques in the respect that upon completion of the molding step, and while the mold 10 and molded part 12 are still at an elevated temperature, above the heat-distortion point of the plastic resin, the mold is rapidly chilled by cold water sprays or by cold air, causing the plastic to chill rapidly and to stiffen and become relatively rigid before the air trapped inside has had a chance to cool and contract. As a result, the molded part becomes rigid almost instantaneously, and therefore is stiff enough so that it can resist collapsing due to the partial vacuum created inside the part by cooling and contraction of the trapped air. FIG. 3 shows mold 10 being chilled by cold water spray issuing from spray nozzles 14. The mold 10 is preferably made of cast aluminum, and may have a wall thickness of about ½ inch. Heat exchange is therefore quite rapid, and the mold chills very quickly in the cold water spray.

THe unique molding process of the invention, as described above, is summarized in the flow diagram of FIG. 1. It will be noted that the first step of the flow diagram comprises: rotational molding of a totally closed, hollow envelope, without seams or vent holes, using fusible molding resin powder in a mold that is heated above the fusion temperature of the resin. The second step of the process comprises: rapid chilling of the molded part from a temperature above the heat distortion point of the resin to a temperature well below the heat distortion point, causing the plastic to stiffen and become relatively rigid before it can be collapsed by the partial vacuum inside the part due to contraction of the enclosed air as it cools.

Another method of carrying out the invention is shown by the flow diagram of FIG. 5, and accompanying FIGS. 6 and 7. The molded part 16 shown in FIGS. 6 and 7 is what is known as a trailer buoy, and has a cylindrical body 18, with a conical end portion 20 having flattened sides at 22, and a molded eye 24 to which mooring lines can be attached.

In FIG. 5, the first step of the process is the same as the first step of FIG. 1. A measured quantity of thermoplastic or fusible resin powder or pellets, preferably cross-linkable polyethylene, is placed inside the cavity of the mold, after which the mold is closed and then rotated simultaneously about the two axes of rotation, while the mold is heated up to the fusion temperature of the plastic resin. The powdered or pelleted resin melts and spreads uniformly over the entire inside surface of the mold cavity, forming a continuous, uninterrupted shell of melted plastic. Cross-linking of the polyethylene proceeds during the molding cycle, and the finished product is essentially fully cross-linked.

Upon completion of the molding process, the mold and its molded part are cooled down, and the still-hot part is removed from the mold. As the molded part 16 cools, the air and any other gases trapped inside cool and contract, and since there is no vent hole or other means for air to enter the interior of the part, a partial vacuum, of the order of 0.75 atmospheres is formed. The pressure differential between atmospheric pressure on the outside and sub-atmospheric pressure on the inside of the part, is enough to overcome the elastic strength of the still-hot plastic, and the result is that one wall of the part collapses inwardly, as shown at 26 in the drawing (FIG. 6).

The distorted molded part 16 is then heated in an air circulating oven for 10 minutes at 350° F, which is at or just slightly above the heat distortion point of polyethylene. As the polyethylene resin heats up, the air trapped inside is also heated, causing it to expand to approximately atmospheric pressure. With the air pressure now equalized on the inside and outside of the buoy, the walls of the buoy are now unstressed and relaxed. At the same time, the elastic memory of the heat-softened polyethylene resin causes the deformed portion 26 to spring out to its original molded form, and the part now appears as in FIG. 7. The final step of the procedure is to plunge the hot buoy into a tank of water at 75° F or cooler, where it remains for approximately 5 minutes, in order to cool the air inside the buoy while the plastic is kept cold. Plunging the hot plastic buoy into cool water has the effect of abruptly chilling and stiffening the resin before the air inside has a chance to cool and shrink. The resultant product retains the original molded shape of the buoy before it was collapsed by the partial vacuum inside the part, and once the plastic has been chilled down to temperature of 75° F or less, it is stiff and rigid enough to resist deformation even though the pressure inside is appreciably less than atmospheric pressure.

While I have shown and described the invention in particular with reference to fishing buoys, this method is not limited to the manufacture of fishing buoys, but might be used to make any other totally enclosed article having any of the characteristics of the illustrated fishing buoy. Nor is the invention limited to the use of polyethylene. Any cross-linkable polyolefin, such as polypropylene, might be used. The primary requisites are that the resin must have: (1) the property of plastic memory, and (2) a heat-distortion point above the use temperature. Fully cross-linked polyethylene has a heat-distortion point of about 350° F.

With the method of the present invention, I have produced spherical buoys 14 inches in diameter and with a wall thickness of 0.150 inch, weighing 3¼ lbs. and capable of withstanding continuous submergence to a depth of 7 fathoms. Other 14-inch diameter spherical buoys with a wall thickness of 0.26 inch and weighing 7.2 lbs. have been produced, which are capable of withstanding continuous submergence to 20 fathoms. In contrast with this, molded polyethylene spherical buoys of the same diameter made by conventional molding techniques require a wall thickness of 0.600 inch to withstand 20 fathoms submergence, and such buoys weigh approximately 18 lbs. each. The difference in weight between buoys made by the present method and those made by conventional molding techniques is an important factor, not only to the manufacturer, to whom the weight represents an expensive investment in excess plastic resin, but also the fishermen who may have to haul in hundreds of buoys each day, lifting them over the bulwarks of the ship and handling them on deck.

It will be understood by those skilled in the art that this invention is not limited to the particular shape shown in the drawings, but might take various shapes within the scope of the following claims.

I claim:

1. The method of making a completely closed, thin-walled, hollow envelope of thermoplastic resin material, in which the molded part has a continuous, uninterrupted surface without a vent hole, said method comprising the steps of:

1. loading fusible resin particles into a hollow mold and rotationally molding said part while heating the mold to a temperature above the fusion point of the resin;
2. cooling the mold and molded part sufficiently to allow the part to be removed from the mold, while allowing the unvented part to collapse partially as the air inside cools and contracts;
3. reheating the partially collapsed molded part to a temperature only slightly above the distortion point of the resin, so that the air inside the part is heated and expanded until the pressure differential between the inside and the outside is substantially reduced, and elastic memory of the heat-softened resin causes the molded part to return to the uncollapsed form that it had at the time the resin solidified during the rotational molding step;
4. abruptly chilling said part to solidify and stiffen the plastic resin in said uncollapsed form before the air inside the part has had time to cool and contract.

* * * * *